US009779561B1

(12) United States Patent
Dorrance et al.

(10) Patent No.: US 9,779,561 B1
(45) Date of Patent: Oct. 3, 2017

(54) DRIVE-THROUGH INSPECTION SYSTEM FOR A MOVING VEHICLE

(71) Applicant: Hunter Engineering Company, St. Louis, MO (US)

(72) Inventors: Daniel R. Dorrance, Ballwin, MO (US); Bruce E. Bernard, St. Charles, MO (US); Aaron C. Hall, St. Louis, MO (US); Nicholas J. Colarelli, III, Frontenac, MO (US)

(73) Assignee: Hunter Engineering Company, St. Louis, MO (US)

( * ) Notice: Subject to any disclaimer, the term of this patent is extended or adjusted under 35 U.S.C. 154(b) by 6 days.

(21) Appl. No.: 14/947,940

(22) Filed: Nov. 20, 2015

Related U.S. Application Data

(60) Provisional application No. 62/084,396, filed on Nov. 25, 2014, provisional application No. 62/198,860, filed on Jul. 30, 2015.

(51) Int. Cl.
*G01M 17/00* (2006.01)
*G07C 5/08* (2006.01)
(Continued)

(52) U.S. Cl.
CPC ............ *G07C 5/0808* (2013.01); *G01B 11/00* (2013.01); *G01L 17/00* (2013.01); *G01M 17/027* (2013.01);
(Continued)

(58) Field of Classification Search
CPC ...... G07C 5/0808; G07C 5/02; G01B 11/272; G01B 11/00; G01B 11/127; G01L 17/00;
(Continued)

(56) References Cited

U.S. PATENT DOCUMENTS 4,123,023 A 10/1978 Nelson
4,153,131 A 5/1979 Sakata et al.
(Continued)

FOREIGN PATENT DOCUMENTS

WO 2014134719 A1 9/2014
WO 2014151666 A1 9/2014

OTHER PUBLICATIONS

Sensing Solutions—Automotive Industry, pp. 1-12, 2005, Keyence Corporation, Product Lit. No. SS05S-AUTO-KA-L-E 0085-1, Japan.
(Continued)

*Primary Examiner* — Shardul Patel
(74) *Attorney, Agent, or Firm* — Polster, Lieder, Woodruff & Lucchesi, LC

(57) ABSTRACT

A vehicle measurement station utilizing at least one displacement sensor disposed on each opposite side of a sensor region of a vehicle inspection lane to acquire displacement measurement data, associated with a moving vehicle passing through the sensor region. Each displacement sensor is configured to acquire measurement data along at least three discrete and vertically spaced measurement axes. A processing system receives the acquired data for evaluation, identification of outlier data points, and for determining a measurement associated with a characteristic of the moving vehicle, such as vehicle velocity, axle alignment, wheel alignment, or dimensions.

21 Claims, 9 Drawing Sheets

(51) Int. Cl.

| | |
|---|---|
| *G01B 11/00* | (2006.01) |
| *G01P 3/36* | (2006.01) |
| *G01M 17/04* | (2006.01) |
| *G01M 17/06* | (2006.01) |
| *G01M 17/02* | (2006.01) |
| *G01L 17/00* | (2006.01) |
| *G07C 5/02* | (2006.01) |

(52) U.S. Cl.
CPC ............ *G01M 17/04* (2013.01); *G01M 17/06* (2013.01); *G01P 3/36* (2013.01); *G07C 5/02* (2013.01)

(58) Field of Classification Search
CPC .... G01M 17/027; G01M 17/02; G01M 17/13; G01M 17/04; G01M 17/06; G01P 3/36
USPC ........... 701/31.4, 29.3, 29.5; 33/288, 203.19, 33/203.16; 348/57; 73/146, 115.07
See application file for complete search history.

(56) References Cited

U.S. PATENT DOCUMENTS

| | | | |
|---|---|---|---|
| 4,341,021 A | 7/1982 | Beissbarth | |
| 4,745,469 A | 5/1988 | Waldecker et al. | |
| 4,863,266 A | 9/1989 | Masuko et al. | |
| 4,899,218 A | 2/1990 | Waldecker et al. | |
| 5,220,399 A | 6/1993 | Christian et al. | |
| 5,532,816 A * | 7/1996 | Spann | G01B 11/2755 33/203.19 |
| 5,600,435 A | 2/1997 | Bartko et al. | |
| 5,731,870 A | 3/1998 | Bartko et al. | |
| 5,793,492 A | 8/1998 | Vanaki | |
| 5,818,574 A | 10/1998 | Jones et al. | |
| 6,151,562 A | 11/2000 | Merrill | |
| 6,412,183 B1 | 7/2002 | Uno | |
| 6,545,750 B2 * | 4/2003 | Roth | G01B 11/2755 33/203.16 |
| 6,559,936 B1 * | 5/2003 | Colombo | G01B 11/275 33/288 |
| 6,657,711 B1 | 12/2003 | Kitagawa et al. | |
| 6,748,796 B1 | 6/2004 | Van Den Bossche | |
| 6,894,771 B1 | 5/2005 | Dorrance et al. | |
| 7,177,740 B1 | 2/2007 | Guangjun et al. | |
| 7,336,350 B2 | 2/2008 | Dorrance et al. | |
| 7,454,841 B2 | 11/2008 | Burns, Jr. et al. | |
| 7,774,946 B2 | 8/2010 | Boni et al. | |
| 7,864,309 B2 | 1/2011 | De Sloovere et al. | |
| 8,107,062 B2 * | 1/2012 | De Sloovere | G01B 11/25 356/139.09 |
| 9,545,966 B2 * | 1/2017 | Kim | B62D 65/005 |
| 2003/0094039 A1 * | 5/2003 | Poulbot | B60T 8/1725 73/146 |
| 2003/0142294 A1 * | 7/2003 | Jackson | G01B 5/0025 356/139.09 |
| 2004/0128844 A1 * | 7/2004 | Robb | G06T 7/70 33/203.18 |
| 2006/0090356 A1 * | 5/2006 | Stieff | G01B 11/2755 33/288 |
| 2006/0152711 A1 * | 7/2006 | Dale | G01B 11/2755 356/139.09 |
| 2007/0043487 A1 * | 2/2007 | Krzystofczyk | G06Q 10/06 701/29.5 |
| 2007/0044537 A1 * | 3/2007 | Knox | G01M 17/06 73/11.04 |
| 2007/0096012 A1 * | 5/2007 | Voeller | H04L 67/12 250/208.1 |
| 2007/0124949 A1 | 6/2007 | Burns, Jr. et al. | |
| 2009/0197228 A1 * | 8/2009 | Afshar | G06Q 10/06 434/219 |
| 2010/0180676 A1 * | 7/2010 | Braghiroli | G01M 17/027 73/146 |
| 2013/0132027 A1 * | 5/2013 | Stieff | G01M 17/013 702/151 |
| 2013/0158777 A1 * | 6/2013 | Brauer | G06Q 10/20 701/31.4 |
| 2013/0282231 A1 * | 10/2013 | Farr | G06F 7/00 701/34.4 |
| 2014/0129076 A1 * | 5/2014 | Mouchet | G07C 5/0808 701/29.3 |
| 2014/0253908 A1 * | 9/2014 | Lee | G01B 11/2755 356/139.09 |
| 2014/0253909 A1 * | 9/2014 | McClenahan | G01B 11/2755 356/139.09 |
| 2014/0310967 A1 * | 10/2014 | Nagornov | G01B 21/26 33/301 |
| 2015/0059458 A1 * | 3/2015 | Lee | G01B 11/2755 73/115.07 |
| 2015/0219785 A1 * | 8/2015 | Tudor | G01V 5/0016 378/57 |

OTHER PUBLICATIONS

CCD Laser Displacement Sensor General Catalog LK-G Series, pp. 1-22, 2006, Keyence Corporation, Product Lit. No. LKG-KA-C3-E 0076-1, Japan.

CCD Laser Displacement Sensor General Catalog LK-G Series, pp. 1-22, 2006, Keyence Corporation, Product Lit. No. LKG-WW-C3-E 0096-1, Japan.

K. De Sloovere, W. Pastorius, Ph.D, Wheel Alignment Goes 3-D, pp. 1-5, Nov. 5, 2010, Quality Digest Magazine, www.qualitydigest. com.

x-3Dprofile—Dürr Reinvents Wheel Geometry Measurement, pp. 1-2, 2007, Dürr Assembly Products, www.durr.com.

Optima Laser Distance Sensor, pp. 1-2, Mar. 2004, BS2 Multidata GmbH, www.bs-multidata.com.

Sidis 3D-CAM Wheel Alignment Benches With Innovative Measuring System, pp. 1-8, 2010, Siemens AG, Germany.

Banalogic, Fastlign—The Gold Standard in Vehicle Alignment and Tracking Verification, Banalogic Corp. product literature, pp. 1-4, Oct. 2013, Raleigh, USA.

* cited by examiner

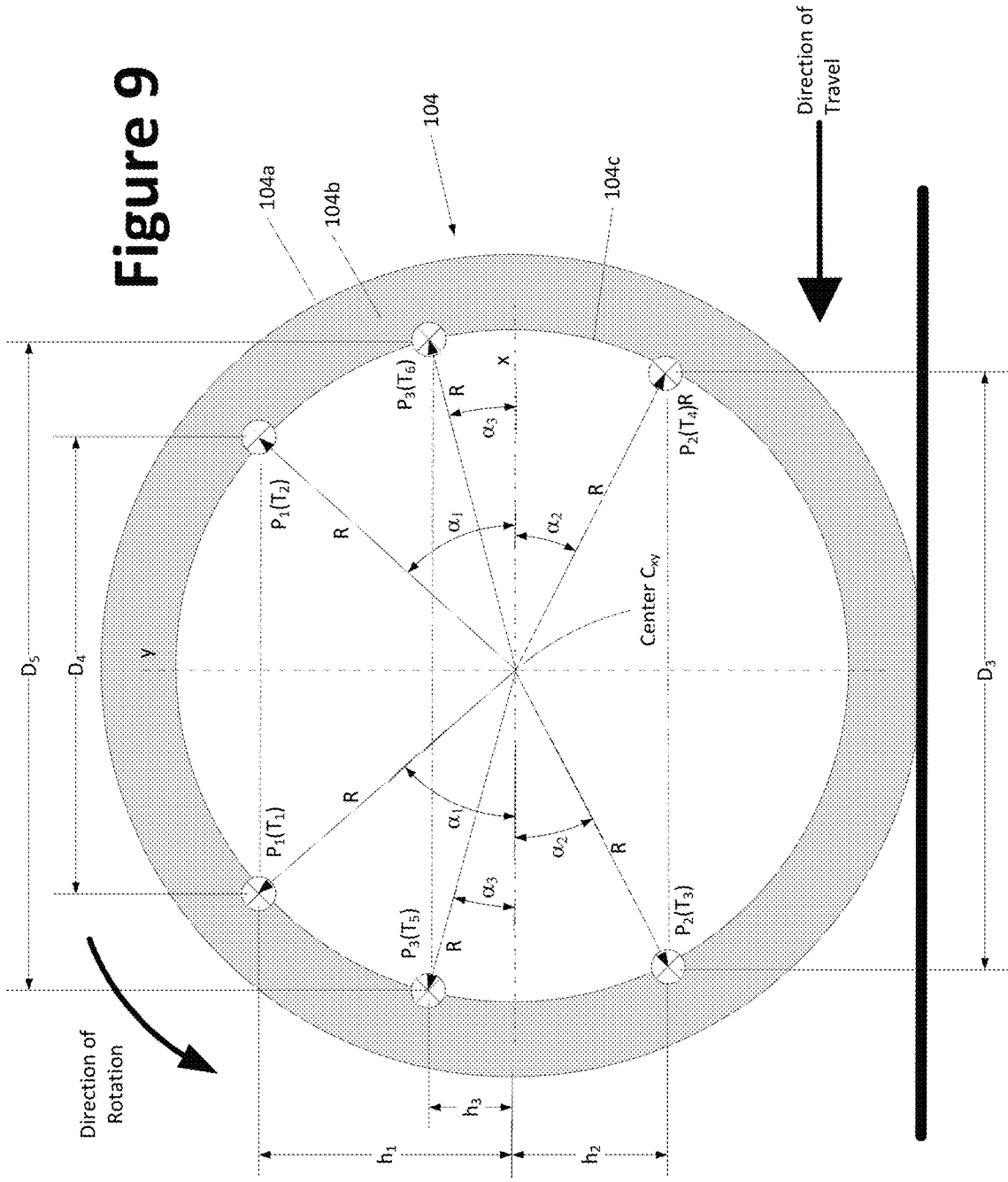

DRIVE-THROUGH INSPECTION SYSTEM FOR A MOVING VEHICLE

CROSS-REFERENCE TO RELATED APPLICATIONS

The present application is related to, and claims priority from, U.S. Provisional Patent Application Ser. No. 62/084,396 filed on Nov. 25, 2014, and from U.S. Provisional Patent Application Ser. No. 62/198,860 filed on Jul. 30, 2015, both of which are herein incorporated by reference.

STATEMENT REGARDING FEDERALLY SPONSORED RESEARCH

Not Applicable.

BACKGROUND OF THE INVENTION

The present application is related to vehicle measurement or inspection systems, and in particular, to a vehicle inspection or measurement system configured to utilize one or more displacement sensors to acquire measurement data associated with various components of a vehicle as the vehicle moves through a vehicle inspection lane.

Systems for measuring or inspecting vehicle properties, such as wheel alignment and associated parameters, are traditionally set up for obtaining measurements to a high degree of accuracy under controlled conditions, such as with the vehicle disposed in a stationary location on a level surface or alignment lift rack. These vehicle measurement or inspection systems may require the temporary placement of various inclinometers or optical targets on the vehicle wheels, from which data is acquired to determine the various measurements. In general, vehicle wheel alignment measurement or inspection procedures require a technician to spend time preparing the vehicle for measurements, acquiring the measurements, and optionally performing adjustments necessary to correct any identified problems. Often, a vehicle brought in to a shop for other services may unknowingly be in need of an alignment service as well. However, unless the service technician and the vehicle owner are willing to spend the time required to prepare the vehicle for measurement and proceed with an alignment measurement process, alignment issues will likely remain undetected and unrepaired.

In response to the recognized need for a way to quickly identify vehicles which may require an alignment service, various quick check or dedicated inspection systems have been introduced to the market, such as the Quick Check® System from Hunter Engineering Co. of St. Louis, Mo. These systems provide an operator with the tools and procedures necessary to quickly (in less than three minutes) obtain basic measurements of important vehicle wheel alignment angles, enter vehicle identifying information (such as through a VIN barcode scan), and review vehicle diagnostic information such as battery condition, tire tread depth, and on-board diagnostic messages. If a vehicle quick check or inspection reveals a potential out-of-specification measurement or problem, it can be quickly brought to the attention of the vehicle owner, who may then elect to proceed with a more in-depth vehicle service procedure, such as a full vehicle wheel alignment service using specialized precision equipment.

Often, vehicle quick check or inspection systems require a technician to carry out various tasks during the process, including attachment of optical targets or angle sensors to the wheels of the vehicle, manual measurement of tire tread depths, and the coupling of scanner component to vehicle data ports. In order for the technician to complete these tasks, the vehicle must be stationary for part of the time, such as for the attachment (and subsequent removal) of optical targets or angle sensors. This necessitates establishing a routine or procedure which must be followed by a technician each time a vehicle is brought into the shop for service. During busy times, or when multiple customers are waiting, a technician may not have sufficient time to carry out these routines or procedures for every vehicle, potentially failing to identify vehicles in need of additional services.

Vehicle wheel alignment systems have utilized a variety of techniques for non-contact measurement of stationary vehicle wheel assembly parameters, from which vehicle wheel alignment angles can be determined. For example, by utilizing multiple displacement measurement sensors, displacement measurements between known sensor locations and multiple locations on a stationary vehicle wheel assembly can be measured. Processing the acquired measurements from sensors observing wheels on opposite sides of an axle can identify planes parallel to the wheel assembly surfaces, from which representations of total toe and camber angles for the vehicle can be determined. In other configurations, two-dimensional images of a stationary vehicle wheel assembly are acquired, and image processing algorithms utilized to identify geometric features such as the wheel rim edge, from which a perspective analysis can be performed to determine estimates of vehicle wheel assembly spatial position and orientation. Alternatively, structured light patterns, such as multiple laser lines, or colored stripes, can be projected onto the stationary wheel assembly surface and observed by an imaging system. Deviations in the projected pattern are analyzed to generate representations of the illuminated surfaces, from which vehicle wheel assembly spatial position and orientation can be estimated. In general, these systems require the vehicle to remain stationary relative to the sensors during the measurement acquisition procedure, but some non-contact measurement systems require either the wheel assembly or the sensors be rotated in place about a stationary axis of rotation during the measurement acquisition procedure.

Some non-contact measurement systems can acquire measurements as a vehicle wheel assembly is both rotated and translated past the sensors, i.e., as the vehicle is moved past the sensors. For example, using laser displacement sensors to measure a distance between a fixed sensor and various points on vehicle wheel assemblies on opposite sides of a vehicle as a vehicle is driven at a slow speed between the sensors, enables a system to acquire measurement data along horizontal slices of the wheel assemblies, from which approximations of the wheel spatial orientations can be derived. These types of systems are highly influenced by the speed at which the vehicle travels between the sensors, the angle (straightness) of vehicle travel relative to the sensor observation axis, suspension movement, the presence and weight of the driver, and changes in steering of the vehicle as it passes between sensors. Measurements acquired from a moving vehicle are useful to provide a vehicle service quick check or audit inspection, capable of identifying vehicles which may be in need of a further, more precise, alignment inspection and/or adjustment.

Accordingly, there would be a benefit to the vehicle service quick check or inspection industry if additional vehicle measurements could be acquired as the vehicle is driven, such as by a customer, through a measurement region of a vehicle inspection lane without stopping, and if variations in vehicle speed, steering, suspension movement, driver presence, or direction of travel could be identified and/or accounted for during the acquisition of measurements associated with the moving vehicle.

BRIEF SUMMARY OF THE INVENTION

Briefly stated, the present application sets forth a vehicle measurement or inspection system which utilizes one or more displacement sensors disposed in sensor units on opposite sides of a sensor region in a vehicle inspection lane to acquire displacement measurement data associated with a moving vehicle passing through the sensor region. Data acquired by the displacement sensors is processed to measure distances between the displacement sensors and surfaces of the vehicle within the observable fields of view associated with the displacement sensors. A processing system is configured to receive and evaluate the measurement data, together with the known parameters of the measurement system, to identify vehicle parameters such as a velocity of a wheel assembly passing through the sensor region, wheel rim or tire dimensions, and wheel assembly spatial orientations.

In a further embodiment of the present invention, a series of displacement sensors are laterally spaced along each side of a sensor region in a vehicle inspection lane to acquire a collection of independent displacement measurements from wheel assemblies on opposite sides of a moving vehicle passing through the sensor region. An associated processing system is configured to receive the collection of displacement measurements from the displacement sensors for evaluation, identifying outlier displacement measurements, and determining average displacements associated with individual vehicle wheel assemblies of the vehicle, from which approximations of one or more vehicle parameters are computed. These vehicle parameters may include changes in velocity or steering of the vehicle passing through the sensor region, vehicle suspension movement, vehicle axle parameters, and individual wheel assembly spatial orientations.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 9 is an illustration of the linear and angular relationships between rim edge locations on a moving vehicle wheel assembly.

Figure 1:
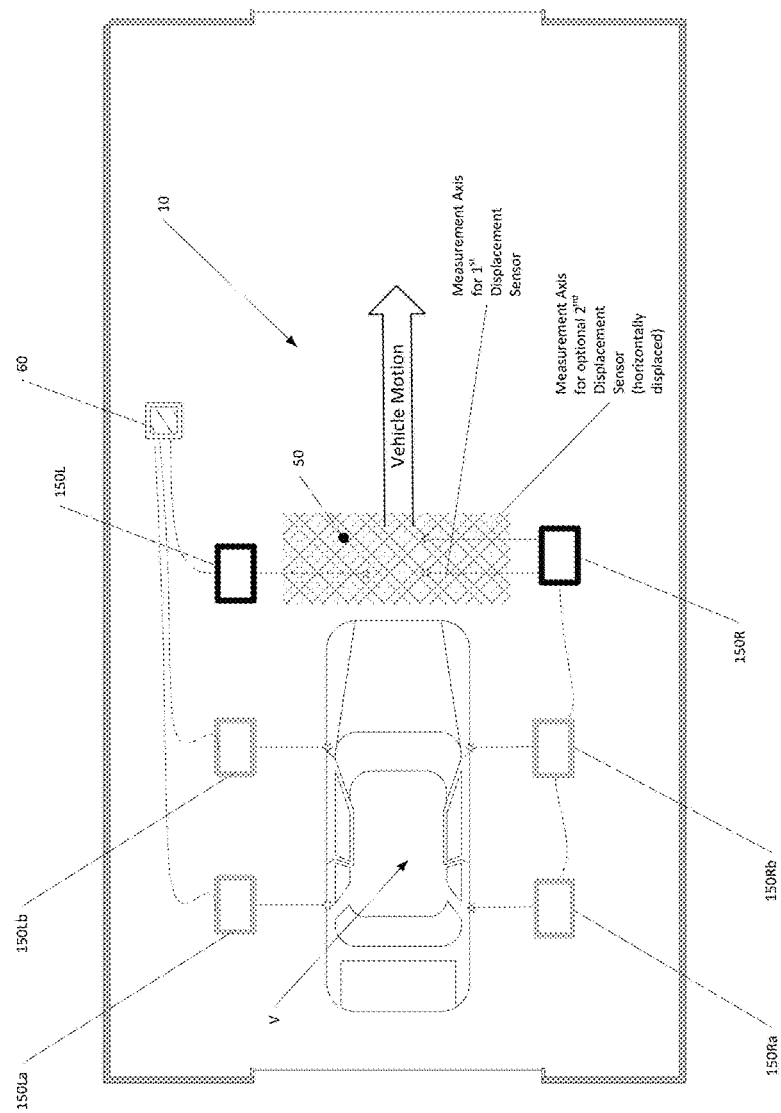
FIG. 1 is a top plan view of a vehicle inspection lane, illustrating exemplary configurations and placement locations for multiple sensor units of the present disclosure.

Corresponding reference numerals indicate corresponding parts throughout the several figures of the drawings. It is to be understood that the drawings are for illustrating the concepts set forth in the present disclosure and are not to scale. Before any embodiments of the invention are explained in detail, it is to be understood that the invention is not limited in its application to the details of construction and the arrangement of components set forth in the following description or illustrated in the accompanying drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

The term "axle", as used herein, is intended to refer to a pair of vehicle wheel assemblies, each consisting of a wheel rim and a tire, disposed on opposite lateral sides of the vehicle, and which are generally axially aligned with respect to each other, such as the left and right front wheels or the left and right rear wheels. The pair of vehicle wheel assemblies may be, but is not limited to wheel assemblies coupled by a solid interconnecting axle shaft, by a pair of half-shafts coupled through a differential, those which are partially independent of each other, or those which are fully independent of each other.

Since the present application describes features which exist on opposite lateral sides of a vehicle inspection lane, but which are otherwise identical, it will be understood that the use of the reference designations Left and Right, or L and R as in the Figures, identify corresponding components utilized at locations relative the left and right lateral sides of a vehicle or vehicle inspection lane. For example, a sensor unit described generically as 150 will be designated as 150R and 150L when specifically shown or described at either the right or left side of the vehicle inspection lane 10.

Figure 2:
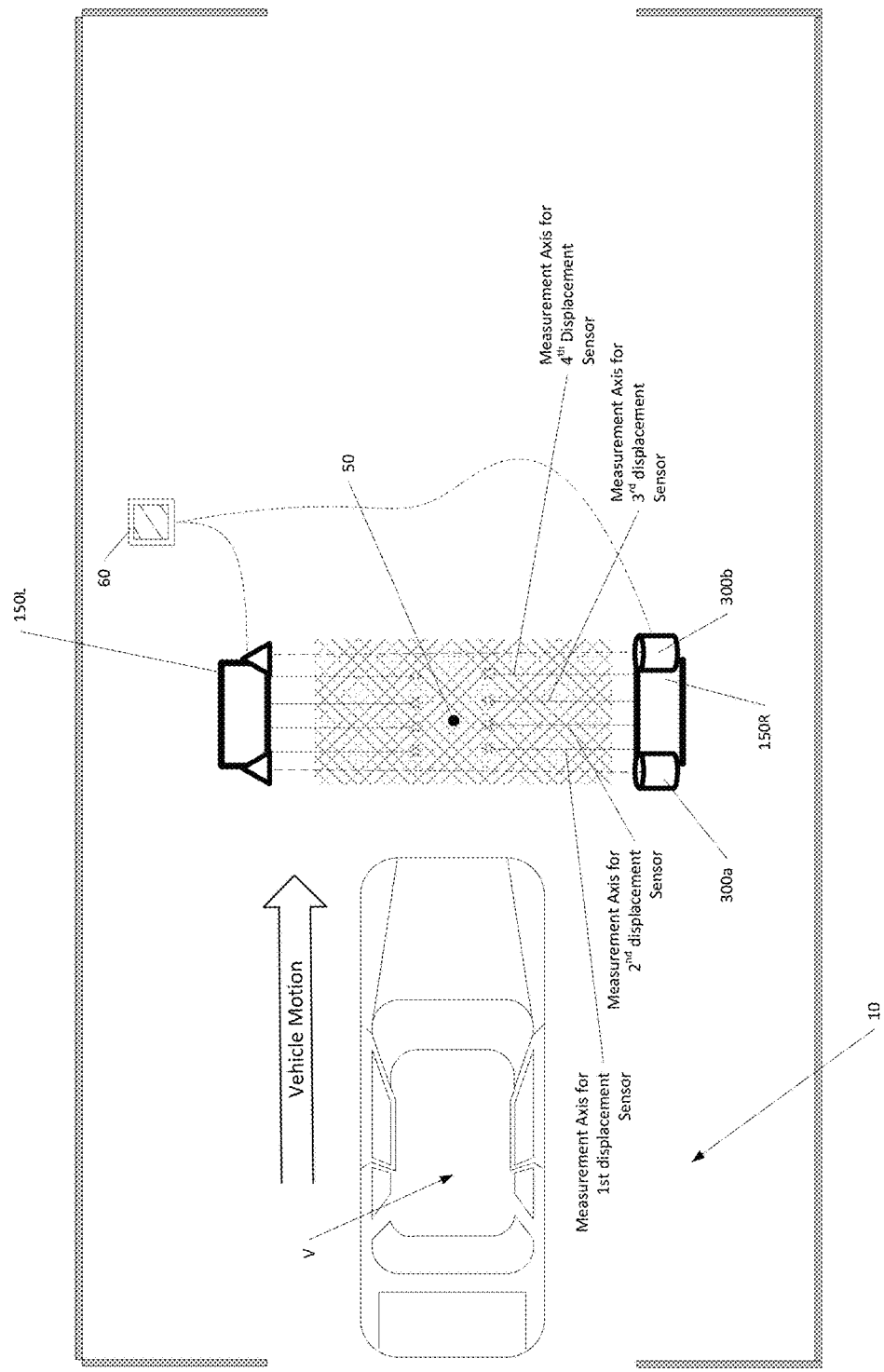
FIG. 2 is a top plan view of a vehicle inspection lane, illustrating an exemplary configuration and placement location for sensor units of the present disclosure in a drive-through configuration.

A vehicle measurement system of the present disclosure is generally intended for use in a vehicle service shop drive-through configuration, where a moving vehicle V is driven through a sensing region 50 within the vehicle service or inspection lane 10, as seen in FIGS. 1 and 2, in a generally straight line (but not necessarily along, or parallel to, a longitudinal midline of the vehicle service or inspection lane 10), while being observed by various sensors acquiring measurement data, and optionally, acquiring vehicle-associated still-frame or motion video images.

The array of sensors provides an operator with an initial diagnostic overview of the moving vehicle V with minimal operator interaction, and may include displacement sensors for acquiring data related to vehicle wheel alignment, drive-over tire tread depth sensors for measuring tire tread wear conditions, and tire pressure measurement sensors for measuring tire inflation conditions. Machine vision systems may be included for recording vehicle body panels for damage or misalignment, for observing tire sidewall markings to identify tire parameters such as size to type, and/or for capturing vehicle identifying information such as license plate data. Depending upon the configuration of the various sensors observing the vehicle V as it moves through the sensing region 50, an operator may be provided, at an operator console 60, with a detailed report on the condition of multiple components of the vehicle V, such as alignment conditions, tire wear conditions, tire pressure measurements, recalled vehicle and customer records, and recommended services and/or replacement parts such as suitably sized replacement tires, without the need to manually identify, record, or retrieve any data.

In one embodiment, the present disclosure sets forth a system for capturing data associated with a moving vehicle V, and such as the individual wheel assemblies 104 on each axle 105. Within the system, one or more sensor assemblies or units 150, each containing at least one displacement sensor 200, are disposed on each lateral side of the sensing region 50 to observe the opposite sides of the vehicle V moving through the sensing region 50. To facilitate placement within an inspection lane 10, each sensor unit 150 may be contained within a vertical tower positioned on a floor surface in proximity to the drive-through sensing region 50, within a wall-mounted housing, within a surface or flush-mount configuration, or within a combination thereof suitable for mounting one or more displacement sensors 200 and their associated components to observe the sensing region 50.

Each displacement sensor 200 is associated with an operational range within which the displacement sensor 200 is capable of measuring, to within a desired tolerance, a distance to an observed surface. Given the wide variation in configurations of vehicles V, each displacement sensor 200 is preferably disposed such that the observed surfaces on an intended collection of vehicle configurations will pass through the associated operational ranges.

Data from the displacement sensors 200 is conveyed to a processing system (local or remote) configured with suitable software instructions to control and/or communicate with the various displacement sensors, receive data therefrom, analyze the received data, receive operator input, and convey resulting measurements to an output. The operator input and output is preferably conveyed through a suitably configured operator console 60.

Each sensor unit 150 consists of a support framework configured as necessary to mount at least one displacement sensor 200, or preferably, two or more laterally spaced displacement sensors 200, such that an operative field of view for each displacement sensor 200 encompasses observable lateral side surfaces associated with a range of measurable vehicles V traversing the sensing region 50 of the inspection lane 10. Displacement sensors 200 are preferably laser displacement sensors, as will be described below, but those of ordinary skill in the art will recognize that other types of displacement sensors, including 2D imaging, time-of-flight optical sensors, and ultrasonic sensors capable of obtaining displacement measurements to surfaces within a field of view may be utilized. Provisions may be included within each sensor unit 150 for additional other types of sensors associated with a vehicle inspection system.

Within a sensor unit 150 containing multiple displacement sensors 200, a lateral spacing between the displacement sensors 200, as well as an associated vertical position of each, may be either random or determined, as each displacement sensor 200 functions as an independent measurement sensor to contribute measurement data to a collection of displacement measurements associated with a vehicle V passing through the inspection lane 10. Displacement measurement data acquired from multiple points or locations on a passing vehicle V, such as from individual wheel assemblies 104, as the vehicle moves through the sensing region 50 of the inspection lane 10 is utilized by the suitably configured processing system to establish average displacement measurements associated with select features on the vehicle, to discard outlier displacement measurements using tolerance ranges or other statistical analysis techniques, or to determine one or more vehicle characteristics.

These vehicle characteristics may include wheel alignment angles (toe, total toe, or camber), vehicle axle conditions, vehicle alignment axes (thrust line, body centerline, etc.), vehicle dimensions, wheel runout, changes in vehicle velocity (braking or accelerating), oscillations in the vehicle suspension (such as from driving over a raised lip or recessed drain in the inspection lane floor surface), biased distortion in the suspension due to the presence of a driver seated in the vehicle, and steering changes as the vehicle V passes through the vehicle inspection lane 10. The processing system may be further configured to evaluate vehicle characteristics determined from multiple measurements acquired by a single displacement sensor, or from measurements acquired by multiple displacement sensors 200 to identify and/or discard determined vehicle characteristic values which are considered outliers, which fall outside of an acceptable tolerance, or which are based on an insufficient number of underlying measurements to reach a predetermined level of confidence.

An individual laser displacement sensor 200 generally consists of an imaging sensor 202 having a field of view FOV to receive reflected light from a surface illuminated by at least one associated laser emitter 204 or other associated light source. Preferably, a set of two or more laser emitters 204 are aligned in a vertically spaced arrangement on a support stand 206 together in a fixed relationship with the imaging sensor 202. In one embodiment, illustrated in FIG. 3, a total of four vertically spaced laser emitters 204 are associated with a single imaging sensor 202. Greater or smaller numbers of laser emitters 204 may be employed without departing from the scope of the present disclosure, depending upon the amount of displacement measurement data to be collected for processing and averaging. The known or determinable vertical spacing between each laser emitter 204 may be uniform, varied, or symmetric. Each laser emitter 204 is configured to project a laser beam 208, preferably parallel to the ground G or vehicle support surface, onto surfaces of the vehicle V passing through the field of view FOV of the associated imaging sensor 202, such that reflected laser light 210 from the surfaces is received on a pixel array 205 of the associated imaging sensor 202 after passing through an appropriate focusing lens or optical system.

Figure 4:
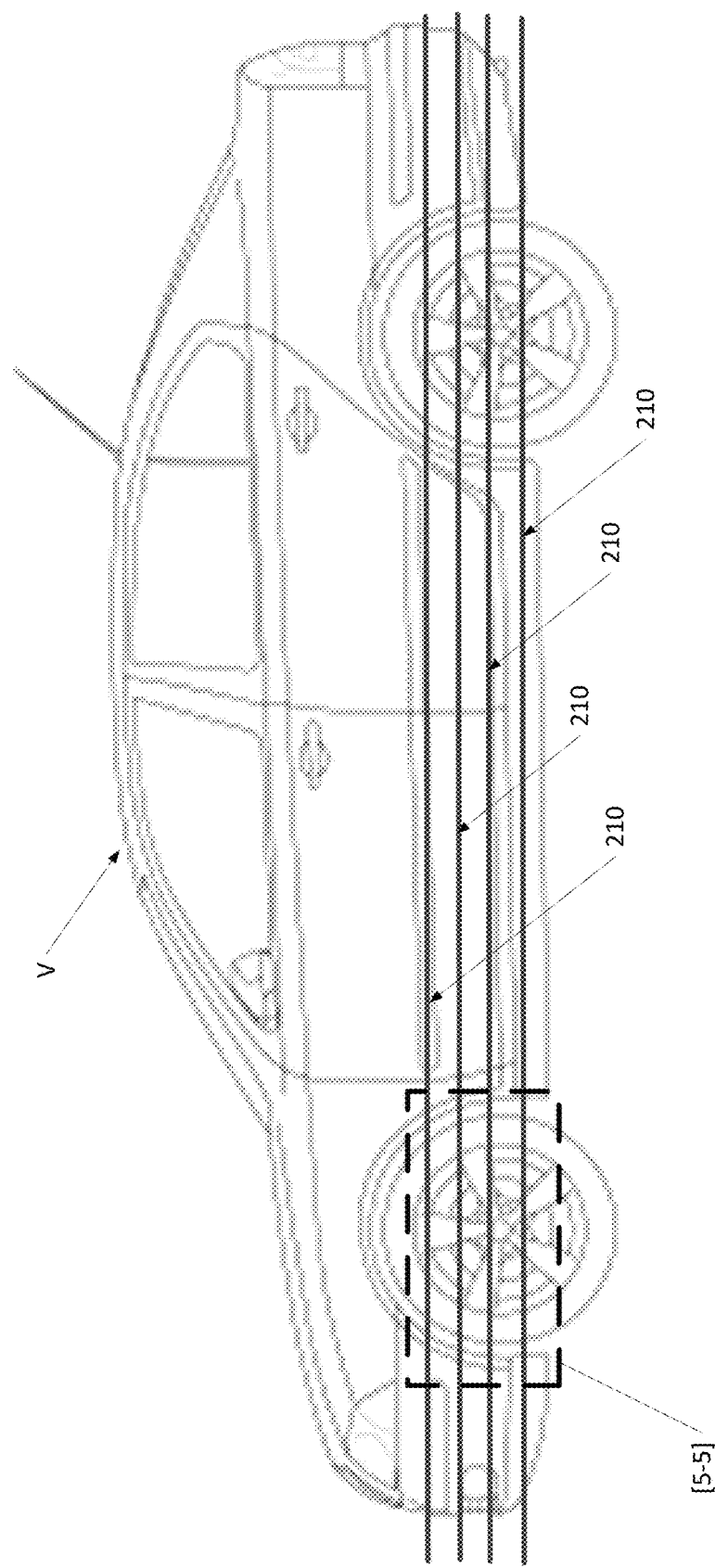
FIG. 4 is a side plan view of a vehicle V, illustrating the contours of reflected laser light as the vehicle V moves past a single displacement sensor of FIG. 3.

Those of ordinary skill in the art will recognize that additional laser emitters 204 may be utilized to project a plurality of parallel laser beams (for example, defining a grid of illuminated points on the surface of an observed object)

which are subsequently reflected onto the pixel array 205 of the associated imaging sensor 202 without departing from the scope of the present disclosure. As a vehicle moves past the individual laser displacement sensor 200 each laser beam 208 will intersect the moving vehicle surfaces at a different vertical elevation, such that the reflected laser light 210 from each beam is tracked along an associated horizontal contour on the side surfaces of the vehicle V by the vehicle movement, as seen in FIG. 4.

Figure 5:
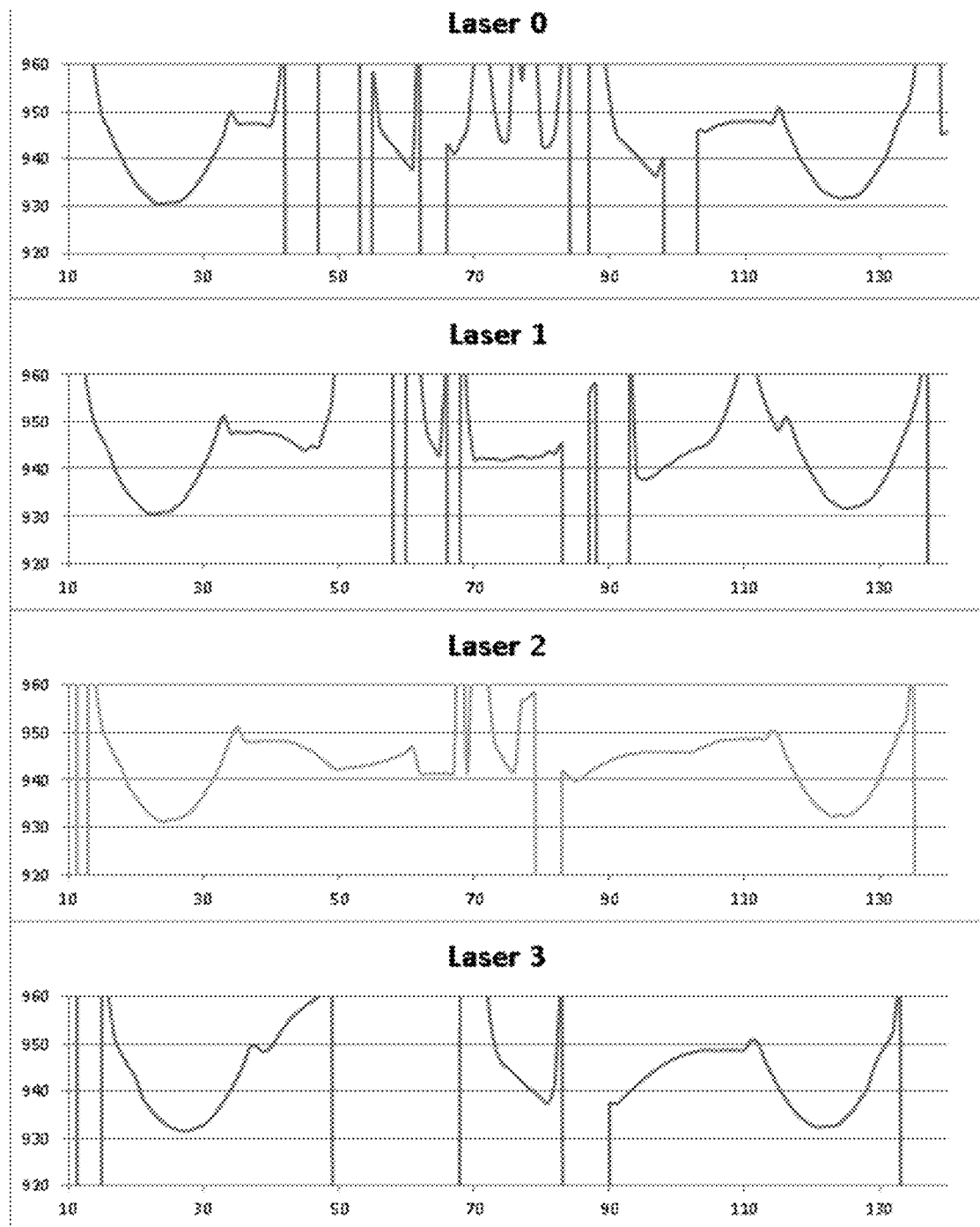
FIG. 5 is a representative plot of linear displacement measurements acquired from a set of four lasers within a single displacement sensor of FIG. 3, representative of contours intersecting a vehicle wheel assembly the region 5-5 of FIG. 4.

The distribution and characteristics of the reflected laser light 210 received at the pixel array 205 corresponds at least partially with the characteristics of the surface from which the laser beams 208 are reflected. The spatial location of the pixels 400 (individual light sensing elements) in the pixel array 205 which receive the reflected light are used to determine the precise displacement of the point from which the laser beams 208 were reflected, relative to the light sensing pixel array 205, preferably to a sub-pixel resolution. As the displacement of the observed surface changes relative to the stationary pixel array 205 due to movement of the vehicle V, corresponding changes occur in the incident location of the reflected laser light 210 on the light sensing pixel array 205. Through image processing, distribution and characteristics of the observed reflected laser light 210 may be used, together with known parameters of the displacement sensor 200, to triangulate at discrete points in time, the relative spatial location of the point of reflection on a surface of the moving vehicle V within the field of view FOV and sensing region 50. For example, as seen in FIG. 5, the reflected laser light 210 from a set of laser beams 208 in an individual displacement sensor 200 are observed by the imaging sensor 202 as they cross the surfaces of a vehicle wheel assembly, generating a set of associated displacement measurements identified as Lasers 0-3, with Laser 0 producing the vertically lowest contour trace in FIG. 4, and Laser 3 producing the vertically highest contour trace across the vehicle surfaces.

Figure 6:
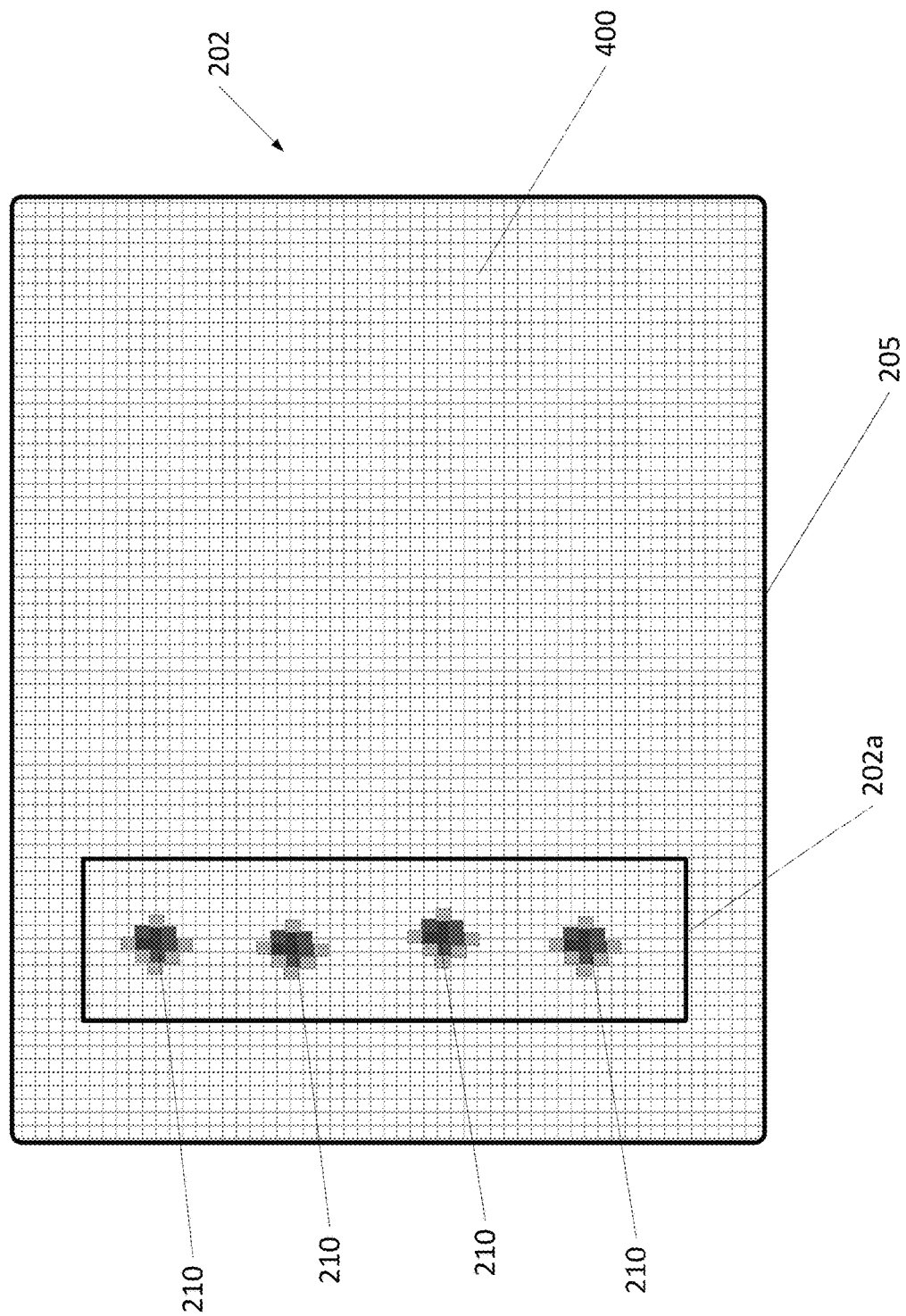
FIG. 6 illustrates an exemplary imaging sensor pixel array of a displacement sensor, sub-windowed to encompass pixels illuminated by reflected laser light from an associated array of lasers.

The reflected laser light 210 may be representative of a projected dot, line segment, geometric shape, or other figures, such as an "x" or a "+", depending upon the particular optical configuration of the associated laser emitter 204 and any intervening focusing lenses or optical elements. As shown in FIG. 6, when the laser emitters 204 are arranged in an aligned and vertically stacked configuration, the data acquired from the observing imaging sensor 202 can be limited to pixel data from a sub-window 202a of pixels 400 within the pixel array 205 of the imaging sensor 202 which receive the reflected laser light 210 from the vertically spaced array of projected laser beams 208 seen in FIG. 3. With suitable hardware, the light sensing pixel array 205 can be virtually segmented into one or more individual sub-windows or regions 202a, each of which can be "read" individually. For example, a VITA-5000 CMOS image sensor available from ON Semiconductor provides the capability of clocking-out or reading at least two separate sub-windows or regions of interest 202a from a single light sensing pixel array 205. Limiting the region-of-interest to one or more sub-windows 202a facilitates data compression, ignores illumination from surfaces outside of a defined region of interest, and increases transfer rates of pixel data from the imaging sensor 202 to an associated processing system.

In addition to establishing a displacement measurement, the distribution of the reflected laser light 210 on the pixel array 205, and any observed changes therein may optionally be analyzed by a processing system to identify characteristics of the reflecting surface, such as material type, reflectivity, or transparency. The established relationship of the laser beams 208 to each other, i.e., parallel, horizontally displaced, vertically displaced, or both horizontally and vertically displaced relative to a reference plane such as the ground G, provides additional information about the illuminated surfaces, such as an angular orientation between the surfaces, or the motion of the surfaces.

In an embodiment of the present disclosure illustrated in FIG. 2, one sensor unit 150L, 150R is disposed on each side of a sensing region 50 of an inspection lane 10 through which a vehicle V passes. Each sensor unit 150L, 150R is configured with a set of four laterally spaced displacement sensors 200, each having a set of laser emitters 204 configured to project laser beams 208 in an associated vertical plane containing a corresponding measurement axis. In the embodiment shown, each displacement sensor 200 is configured to observe reflected light from a set of four vertically spaced laser beams 208, such that a total of sixteen discrete measurement points are potentially available on each side surface of a vehicle V passing through the sensing region 50. Those of ordinary skill in the art will recognize that changes in the number of displacement sensors 200, or the number of laser beams 208 associated with each individual displacement sensor 200, will provide a corresponding increase (or decrease) in the number of potentially available measurement points from which data can be collected by the associated imaging sensors 202. At a minimum, a single displacement sensor 200 including a single laser beam 208 may be disposed as the "array" within the sensor units 150L, 150R on each side of the sensing region 50 of the inspection lane 10.

By using multiple displacement sensors 200, each having multiple laser emitters 204, a greater number of displacement measurements can be acquired from a passing vehicle V, enabling the system 100 to determine useful representations of vehicle characteristics even if several of the acquired displacement measurements are discarded as outliers or otherwise unreliable data. Correspondingly, by using multiple measurements of the same surfaces of the passing vehicle V, multiple representations of a vehicle characteristic can be determined and evaluated to discard outlier results or otherwise questionable values using tolerance ranges or comparisons with the values determined by adjacent displacement sensors 200. The number of measurement values or determined representations of a vehicle characteristic discarded as outliers can be used to establish a confidence score or factor to be associated with the remaining measurement values or determined representations. If a sufficient number of measurement values or determined representations are discarded, the remaining data may be treated as suspect or discarded entirely.

To facilitate placement within an inspection lane 10, the sensor unit 150 support framework for the various displacement sensors 200 may be contained within a vertical tower positioned on a floor surface in proximity to the drive-through sensing region 50, a wall-mounted housing, a surface or flush-mount configuration, or a combination thereof, for mounting a plurality of individual displacement sensors systems 200 and their associated components in a laterally spaced arrangement orientated to view the sensing region 50.

Figure 3:
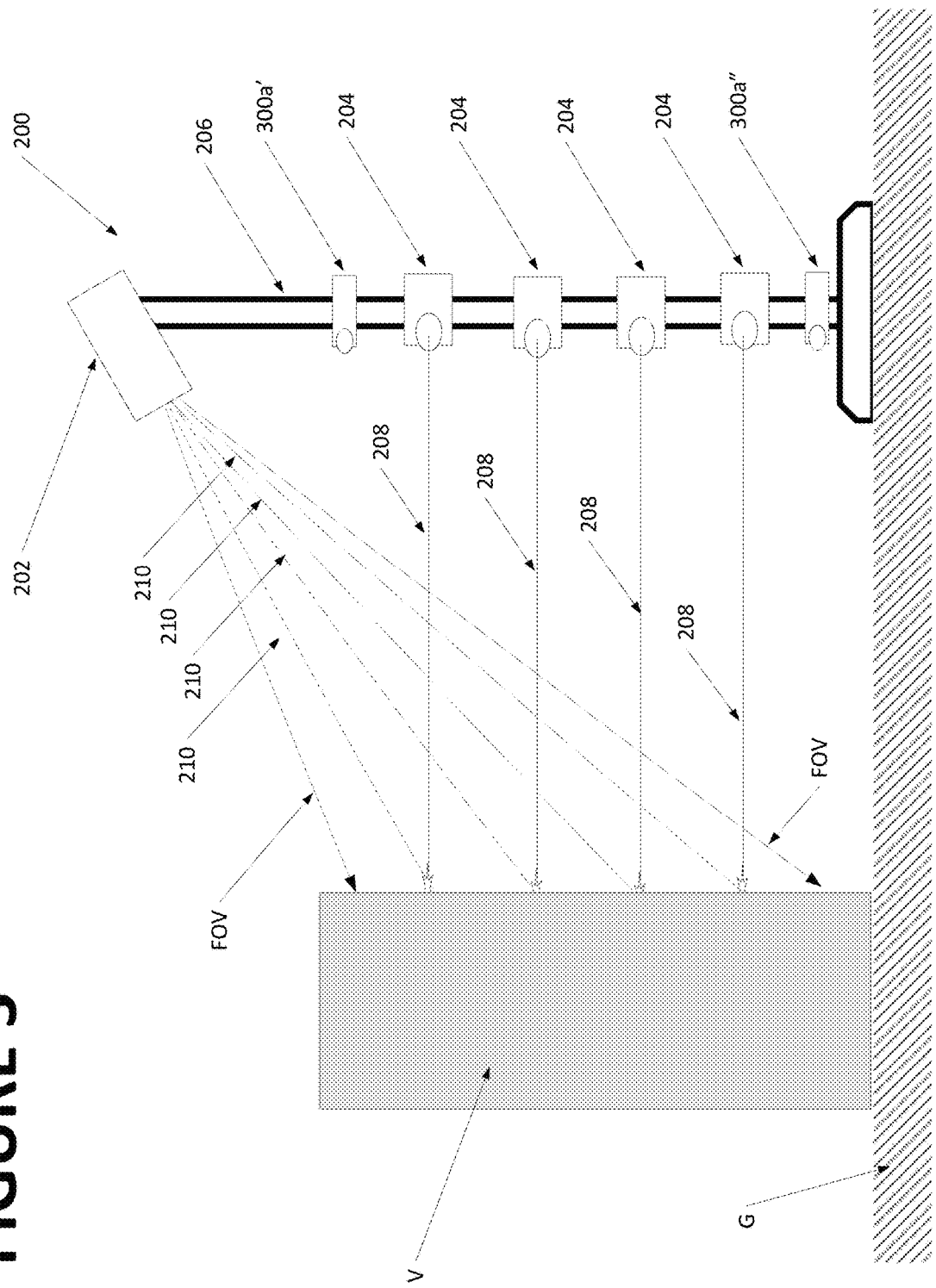
FIG. 3 is a side view of a single displacement sensor within a sensor unit of FIG. 2.

During operation as a vehicle V moves through the sensing region 50, the laser beams 208 from the individual displacement sensors 200 project points of light onto the various surfaces of the vehicle V as the vehicle traverses past the stationary displacement sensors 200. Movement of the vehicle V causes the incident points of the stationary laser beams 208 to traverse contours across the various vehicle surfaces. Positional changes of the reflected laser light 210 received at the light-sensing pixel arrays 205 of each displacement sensor 200 are analyzed by a controller or processor to provide displacement measurement values associated with the distance between the individual points of reflection from the vehicle surfaces and the displacement sensor 200, generating a set of data points defining contour plots representative of the surfaces of the vehicle V along the measurement axis of each of the laser emitters 204, defined by the individual laser beams 208, such as shown in FIG. 3.

Observed changes in laser spot intensity or laser spot size in the light-sensing pixel array 205 may optionally be analyzed to identify characteristics of the reflecting surface, such as material type, reflectivity, or transparency. The established relationship of the parallel laser beams 208 to each other, i.e., horizontally displaced, vertically displaced, or both horizontally and vertically displaced relative to a reference plane, such as the ground G or vehicle support surface, compared with the observed positions of the reflected laser spots 210 on the light-sensing pixel array 205 provide additional information about the illuminated surfaces. This additional information may include, but is not limited to, an angular orientation between the observed surface and the ground G, or the motion of the observed surface relative to the ground G.

Each displacement sensor 200 within a sensor unit 150 acquires displacement measurements associated with an observed set of spaced illuminated points or locations on the side surfaces of a passing vehicle V. A collection of displacement measurements from multiple points or locations on the side surfaces of a passing vehicle V is evaluated using a variety of techniques to obtain average measurements, to discard outlier measurements which exceed a selected tolerance or which show other statistical deviations, and optionally to detect and identify characteristics of vehicle movement which might influence the measurements. Such characteristics of vehicle movement may include, but are not limited to, changes in vehicle velocity (braking or accelerating), oscillations in the vehicle suspension (such as from driving over elevation changes in an inspection lane floor surface), and steering changes as the vehicle V passes through the sensing region 50 in the vehicle inspection lane 10.

Additional factors which may influence acquired measurements include, but are not limited to, wheel assembly runout, tire sidewall raised letter or features, and tire sidewall non-uniformity. For example, the presence of a driver in the moving vehicle V introduces a tilt or bias in the vehicle suspension system, causing the vehicle to lean to dip slightly towards the driver's side, due to an uneven lateral distribution of weight. When a vehicle is measured using a precision vehicle wheel alignment measurement system, typically in a stationary position on a precision level alignment rack, the driver is typically absent from the vehicle, which results in ideal measurement conditions. Accordingly, the presence of the driver in the moving vehicle V during non-contact measurement or inspection can be accounted for by establishing an "average driver" correction factor to apply to vehicle wheel alignment values determined from displacement measurements acquired while the vehicle V is in motion through the inspection lane 10. Different correction factors may be applied to values for different vehicle wheel alignment angles, depending upon how strongly the particular vehicle wheel alignment angle is influenced by the presence of the driver. Similarly, different correction factors may be utilized for different types of vehicles, based on the stiffness or style of the vehicle's suspension system.

During operation, the displacement measurement of the surfaces on a moving vehicle V passing through an inspection lane 10 or sensing region 50 can be triggered in a variety of ways. For example, as shown in FIG. 2, one or more optical triggers 300a, 300b can be disposed across the path of vehicle travel, such that an optical trigger beam is interrupted by the passage of the vehicle, triggering the acquisition of displacement measurements by each displacement sensor 200, as well as measurements or data acquisition by other associated sensors. If the optical triggers 300a and/or 300b are placed below the level of the vehicle body panels, the trigger beams will be interrupted by the passage of the wheel assemblies 104 on each axle 105 of the vehicle V, providing an indication of specific periods of time during which displacement measurements can be acquired from the wheel assembly surfaces. Alternatively, if the optical triggers 300a and/or 300b are placed vertically higher, the trigger beams will be interrupted by the vehicle body panels, and provide an indication of the specific period of time during which the vehicle V is passing through the inspection lane 10 or sensing region 50. If multiple triggers 300a and 300b are provided, the sequence and frequency of the interruptions may be utilized to identify the presence of a vehicle V (as distinguished from a human operator walking past), the number of axles 105 present on a vehicle V, the velocity of the vehicle V, any change in acceleration of the vehicle V within the sensing region 50 (or between the spaced triggers), and when the vehicle V has exited the sensing region 50 such that measurement acquisition can be terminated.

For example, in an inspection lane 10 through which multiple vehicles V will pass in quick succession, utilizing a first optical trigger 300a' at a height suitable for interruption by the vehicle body, together with a second optical trigger 300a", at a height suitable for interruption by the vehicle wheel assemblies, as shown in FIG. 3, aids in distinguishing between back-to-back vehicles V and associating displacement measurements acquired from the wheel assemblies 104 on individual axles 105 with specific vehicles. The first optical sensor 300a' is interrupted as the vehicle V enters the sensing regions, identifying the presence of the vehicle V. As the vehicle V moves through the sensing region 50, the second optical sensor 300a" is alternately blocked and unblocked by the wheel assemblies 104 on each axle 105. So long as the first optical sensor 300a' remains interrupted by the vehicle V, the blocking and unblocking of the second optical sensor 300a" is associated with axles 105 on the current vehicle V. When the first optical sensor 300a' is unblocked as the vehicle V departs the observation area, the axle association from the second optical sensor 300a" is reset, and the system is ready to receive the next vehicle V in succession.

Figure 7:
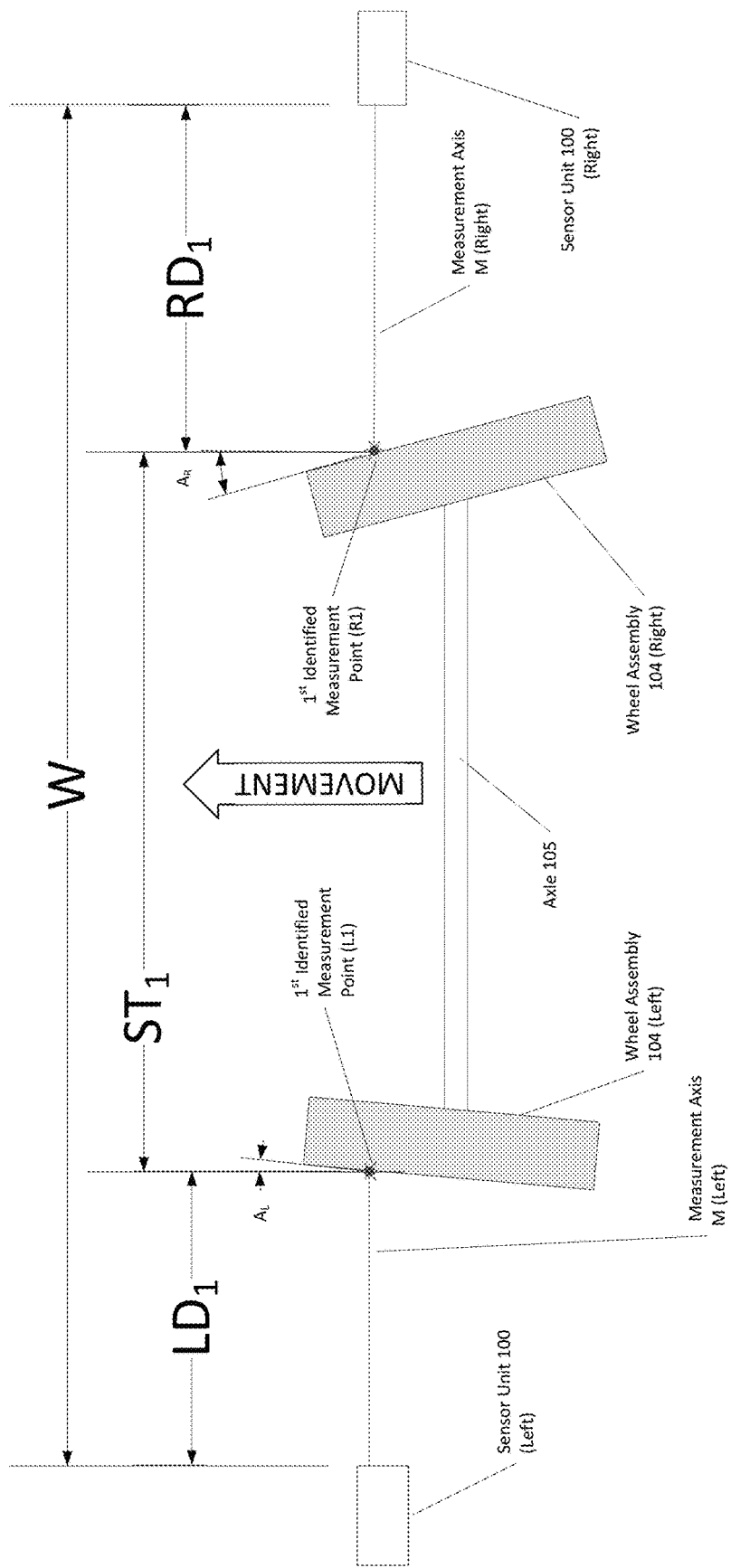
FIG. 7 is a top plan view of the relationships between a pair of opposed displacement sensors and a pair of wheel assemblies on an axle of a moving vehicle, related to measurements of points on leading tire sidewall surfaces.
Figure 8:
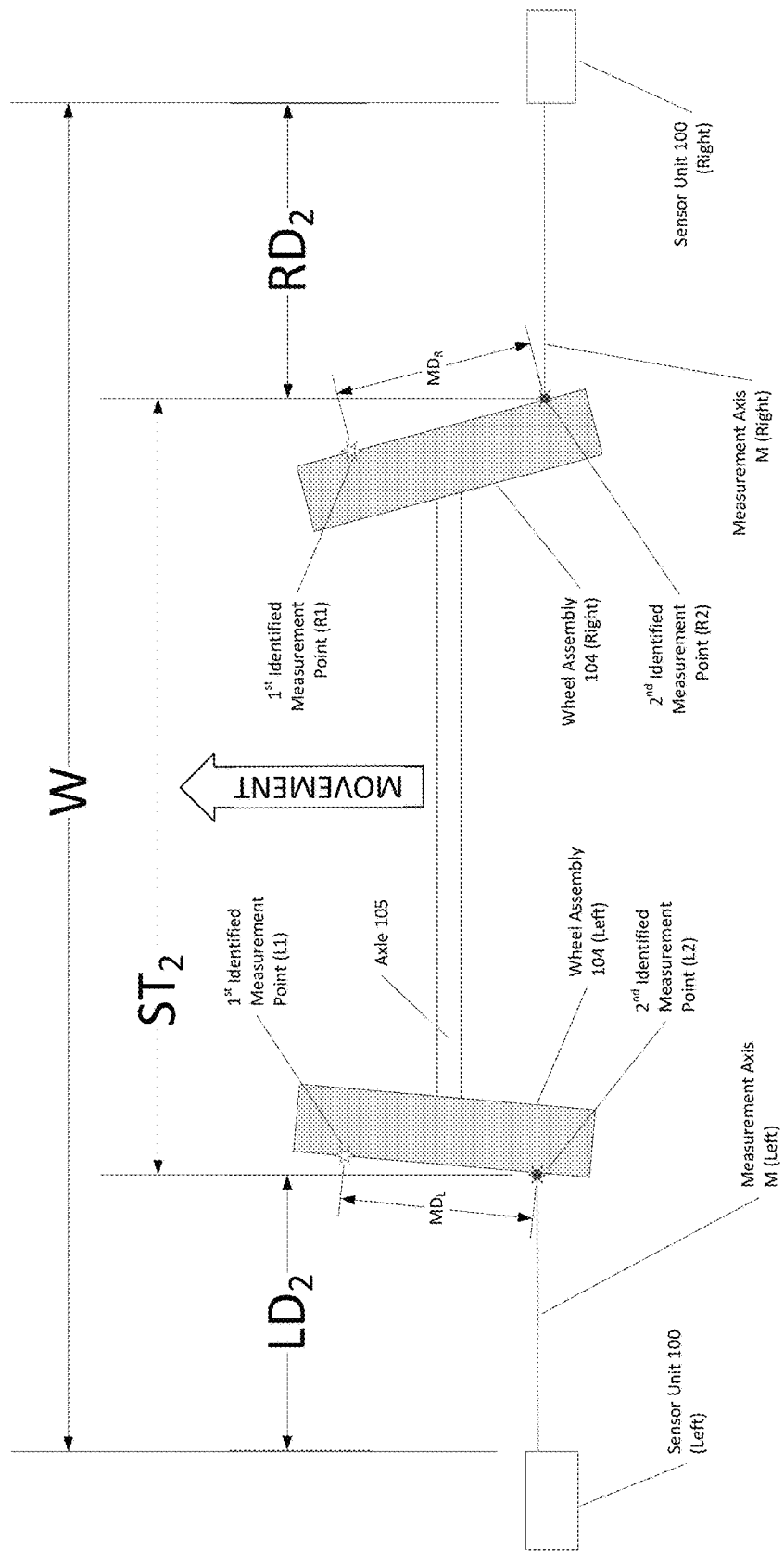
FIG. 8 is a top plan view similar to FIG. 7, related to measurements of points on trailing tire sidewall surfaces.

With reference to FIGS. 7 and 8, displacement measurement data is acquired by the displacement sensor 200 from the surfaces of a vehicle V, such as from vehicle wheel assemblies 104, which are moving generally perpendicular to the optical or measurement axis associated with each laser beam 208 emitted by the laser emitters 204. As the vehicle V moves through the sensing region 50, the combination of translational movement and rotational movement about a center point of the wheel assemblies 104 on an axle 105 enables the stationary displacement sensor 200 to observe displacements as each laser point traverses a horizontal chord across the wheel assembly surfaces, such as shown in FIG. 4. By acquiring a series of displacement measurements as the surfaces of the vehicle V or wheel assembly 104 move past, the displacement sensor 200 generates a set of displacement measurement data points, each associated with a discrete point on the surface of the vehicle V or wheel assembly 104, such as shown in FIG. 5. Preferably, the vertical height of the lasers emitters 204 in each displacement sensor 200 is set such that each laser beam 208 traverses horizontal chord on each wheel assembly 104 which includes two data points on a tire tread outer circumferential edge, and at least two data points on a wheel rim circumferential edge. However, it will be recognized that due to variations in wheel assembly dimensions, some laser beams 208 may not intersect the wheel assembly at all, or may intersect the tire tread outer circumferential edge, but not the wheel assembly rim circumferential edge.

Each set of displacement measurements associated with an individual laser emitter 204 is evaluated using a processing system configured with suitable feature recognition software algorithms to identify features of the surfaces of the vehicle V or vehicle wheel assembly 104 such as the wheel well edge, tire edge points, peak tire sidewall bulge points, and wheel rim edge points. From the identified features, basic alignment information, such as measurements of toe and camber values for the vehicle wheel assembly 104 can be derived. For a vehicle V which is moving in a straight line, with each wheel assembly 104 aligned parallel to the direction of travel (i.e., having zero toe), a horizontal chord of data points acquired as the wheel assembly 104 rolls past the measurement axis of a displacement sensor 200 will preferably intersect, as shown in FIG. 9, at least one circumferential feature of the wheel assembly (such as the tire edge 104a, rim guard feature (not shown), peak tire bulge 104b, or wheel rim edge 104c, at two points, each having the same measured displacement from the sensor. In other words, with reference to FIGS. 5 and 6: (LD at time 1 ($LD_1$)=LD at time 2 ($LD_2$)) or (RD at time 1 ($RD_1$)=RD at time 2 ($RD_2$)).

Vehicle wheels 104 which are not aligned parallel to the straight-line direction of travel for the vehicle (i.e., having non-zero toe such as illustrated in FIGS. 7 and 8) will produce different measured displacements ($LD_1 \neq LD_2$) or ($RD_1 \neq RD_2$) from the displacement sensor 200 for the two points intersecting the selected circumferential feature. Geometric evaluation (arc-tan) of the difference in the displacement measurements, taking into account an appropriate horizontal spacing D (D3, D4, or D5, respectively as seen in FIG. 9) between the locations of the two points on the vehicle wheel assembly 104 as shown in Equation (1), identifies an associated toe angle measurement.

$$TOE = \arctan \frac{(LD_1 - LD_2)}{D} \qquad \text{(Eqn. 1)}$$

When combined with a toe angle measurement for a vehicle wheel assembly 104 on the opposite end of the same axle 105, a measure representative of total toe for that axle can be determined. Measurements associated with the contours traced by individual laser emitters 204 can be evaluated and compared to discard outlier data and produce either a set of individual measurement results corresponding to each laser as observed by the associated imaging sensor, or to produce a compiled result which is mathematically related to the individual measurement results.

In an alternate procedure, toe angle measurements for each individual wheel assembly 104 are not calculated, and only a total toe representation for each axle 105 is calculated. The total toe value for an observed axle 105 is computed directly from the set of wheel assembly displacement measurements RD, LD associated with the wheel assemblies 104L and 104R on an axle 105, without reference to the specific sensor unit separation distance W, without reference to the wheel assembly separation distances $ST_1$ and $ST_2$, and without reference the individual toe values for each wheel assembly 104L and 104R.

$$\text{Total Toe} \cong LD_2 + RD_2 - LD_1 - RD_1 \qquad \text{(Eqn. 2)}$$

The total toe value can alternatively be expressed in angular form by assuming that the lateral distances $MD_L$ and $MD_R$ between the acquired measurements on the face of each wheel assembly 104L and 104R are approximately equal.

$$\text{Total Toe} \cong 2 \cdot \arcsin\left(\frac{-\Delta ST}{MD_L + MD_R}\right) \qquad \text{(Eqn. 3)}$$

Slight differences between $MD_L$ and $MD_R$ resulting from sensor timing, sensor unit 150 placement, or minor steering movement of the vehicle V as it moves through the sensing region 50 can be ignored for purposes of obtaining a Quick Check® type total toe measurement for an axle 105.

In one embodiment, additional information associated with a vehicle wheel assembly 104 and a vehicle V passing through the sensing region 50 is determined using a set of at least six identified points on the vehicle wheel assembly 104 which lie on a common circumferential feature, such as a tire edge 104a, tire bulge peak 104b, tire rim guard (not shown), or wheel rim edge 104c. For example, as shown in FIG. 9, a set of measurement points $P_1T_1$ and $P_1T_2$ corresponding to the two points in time that a laser beam 208 illuminates rim edge 104c, are identified on an upper horizontal chord of measurement points of a vehicle wheel assembly 104. Similarly, a pair of measurement points $P_2T_3$ and $P_2T_4$ corresponding to the two points in time that a second laser beam 208 illuminates the rim edge 104c, are identified on an lower horizontal chord of measurement points of a vehicle wheel assembly 104. Finally, a pair of measurement points $P_3T_5$ and $P_3T_6$ corresponding to the two points in time that a rim edge 104c is observed by a third laser beam 208, are identified on an medial horizontal chord of measurement points of a vehicle wheel assembly 104.

Utilizing these three pairs of data points, together with known characteristics of the displacement sensor 200, a processor configured with suitable software instructions can determine the velocity of the vehicle V passing the sensor unit 150, as well as an estimate of the wheel rim radial dimension R (or the radial dimension for any other circumferential feature on which the measurement points are acquired). Initially unknown parameters include h1, h2, and h3, the respective vertical displacements between the measurement points and the wheel assembly axial center point $C_{xy}$, and $D_3$, $D_4$, and $D_5$, the respective horizontal displacements between each pair of measurements on the horizontal chords, i.e., ($P_1(T_1)-P_1(T_2)$), ($P_2(T_3)-P_2(T_4)$), and ($P_3(T_5)-P_3(T_6)$). Additional unknown parameters include $\alpha_1$, $\alpha_2$, and $\alpha_3$, the respective angles at which the individual measurements were acquired. It should be noted that the total vertical separations $\Delta h_{12}$, $\Delta h_{13}$, and $\Delta h_{23}$ between respective pairs of measurement points are known from the physical configuration of the laser emitters 204 of the displacement sensor 200, as is the period of time between each acquired measurement, i.e., $T_2-T_1=\Delta T_{p1}$, $T_4-T_3=\Delta T_{p2}$ and $T_6-T_5=\Delta T_{p3}$.

Trigonometric relationship establish the following dimensional correspondence:

$$P_1(T_1) \cdot x = -R \cdot \cos(\alpha_1);\qquad\text{Eqn. (4)}$$

$$P_1(T_1) \cdot y = R \cdot \sin(\alpha_1) = h_1;\qquad\text{Eqn. (5)}$$

$$P_1(T_2) \cdot x = R \cdot \cos(\alpha_1);\qquad\text{Eqn. (6)}$$

$$P_1(T_2) \cdot y = R \cdot \sin(\alpha_1) = h_1;\qquad\text{Eqn. (7)}$$

$$P_2(T_3) \cdot x = -R \cdot \cos(\alpha_2);\qquad\text{Eqn. (8)}$$

$$P_2(T_3) \cdot y = -R \cdot \sin(\alpha_2) = -h_2;\qquad\text{Eqn. (9)}$$

$$P_2(T_4) \cdot x = R \cdot \cos(\alpha_2);\qquad\text{Eqn. (10)}$$

$$P_2(T_4) \cdot y = -R \cdot \sin(\alpha_2) = -h_2;\qquad\text{Eqn. (11)}$$

Further simplification yields:

$$P_1(T_1) \cdot x = -(P_1(T_2) \cdot x);\qquad\text{Eqn. (12)}$$

$$P_1(T_1) \cdot y = P_1(T_2) \cdot y = h_1;\qquad\text{Eqn. (13)}$$

$$P_2(T_3) \cdot x = -(P_2(T_4) \cdot x);\qquad\text{Eqn. (14)}$$

$$P_2(T_3) \cdot y = P_2(T_4) \cdot y = h_2;\qquad\text{Eqn. (15)}$$

Seeking to solve for $D_3$, $D_4$, and $\Delta h_{12}$ yields:

$$D_3 = \Delta T_{p2} \cdot V = 2(P_2(T_4) \cdot x) = 2R \cdot \cos(\alpha_2);\qquad\text{Eqn. (16)}$$

$$D_4 = \Delta T_{p1} \cdot V = 2(P_1(T_2) \cdot x) = 2R \cdot \cos(\alpha_1);\text{ and}\qquad\text{Eqn. (17)}$$

$$\Delta h_{12} = P_1(T_2) \cdot y + P_2(T_4) \cdot y = R[\sin(\alpha_1) + \sin(\alpha_2)].\qquad\text{Eqn. (18)}$$

At this point, the number of known variables is three, while the number of unknown variables is four. Hence, the equations cannot be solved without additional information. Utilizing the displacement measurement data from the third measurement point provides the necessary information:

$$\Delta T_{p3} \cdot V = 2R \cdot \cos(\alpha_3);\qquad\text{Eqn. (19)}$$

$$\Delta h_{13} = R[\sin(\alpha 1) + \sin(\alpha_3)];\qquad\text{and Eqn. (20)}$$

$$\Delta h_{23} = R[\sin(\alpha 2) + \sin(\alpha_3)].\qquad\text{Eqn. (21)}$$

There are now six known variables, and only five unknown variable, which can be mathematically determined. These include the various radial angles $\alpha_1$-$\alpha_3$, the velocity of the wheel assembly 104, and the radius R on which the measured points lie.

In a further embodiment, a method for identifying the translational velocity of the vehicle V or wheel assembly 104 passing the sensor units 150 is available whenever a single observed location on a surface of the vehicle V or wheel assembly 104 is identified by two or more displacement sensors 200 or measurements having a known lateral spacing there between. For example, if a pair of laser beams 208 are projected in horizontal parallel alignment towards the surfaces of the vehicle V or wheel assembly 104, and have a known spacing there between, each laser beam will trace the same horizontal path across the surfaces as the vehicle V or wheel assembly 104 moves past the sensor unit 150. Ideally, plots of displacement measurements acquired from the reflected laser light 210 incident at an associated imaging sensor 202, will be identical, but temporally displaced from each other, i.e., phase shifted. With knowledge of the horizontal spacing between the individual laser beams 208, and the time at which each laser beam 208 illuminates an identical point on the vehicle V or wheel assembly 104 surface, it becomes possible to mathematically correlate the signals, such that the speed or velocity of the surface of the vehicle V or wheel assembly 104 can be calculated as a ratio of the horizontal spacing and associated time delay or offset between the signals.

A cross correlation function $y(\tau)$ between signals $x_1$ and $x_2$ representative of the measured distances acquired by each displacement sensor 200 may be defined as:

$$y(\tau) = \int x_1(t+\tau) x_2(t) dt\qquad\text{(Eqn. 22)}$$

This reaches a maximum value when $\tau = \tau_0$. The actual time delay $\tau_0$ can be determined by finding the maximum value of the cross correlation function of the signals $x_1$ and $x_2$:

$$\tau_0 = \Psi(y_{max})\qquad\text{(Eqn. 23)}$$

Where $\psi$ is an inverse function to the cross correlation function of Equation 22.

Given the value of $\tau_0$, the speed of the surface of the vehicle V or wheel assembly 104 surface past the sensor unit 150 can be computed as:

$$v = \frac{L}{\tau_0}\qquad\text{(Eqn. 24)}$$

While the present disclosure has described a vehicle measurement or inspection system in which an output is conveyed to an operator through a suitably configured operator console 60, it will be understood that output may optionally be provided to the operator in the form of a printed report, stored in a machine-readable database, or communicated over a network to a remote vehicle service system or software application. The processing system used with the vehicle measurement or inspection system of the present disclosure may be in the form of a dedicated computer system associated with a specific set of sensors forming a vehicle measurement or inspection system, or may be in the form of a server system configured to communicate with a variety of sensors forming two or more independent vehicle measurement or inspection systems. Communications between the various sensors and the processing system may be via any conventional data transmission means, such as wired networks, wireless networks, or any combination thereof.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle inspection system, comprising:
    a first plurality of displacement sensors disposed in a laterally spaced arrangement along one longitudinal side of a vehicle inspection lane through which a vehicle undergoing inspection is moved in a longitudinal direction, each displacement sensor in said first plurality of displacement sensors configured to acquire a plurality of displacement measurements associated with wheel assemblies on a first lateral side of a vehicle moving through said vehicle inspection lane, said plurality of displacement measurements from each displacement sensor acquired from a plurality of different vertical elevations;
    a second plurality of displacement sensors disposed in a laterally spaced arrangement along an opposite longitudinal side of said vehicle inspection lane, each displacement sensor in said second plurality of displacement sensors configured to acquire a plurality of displacement measurements associated with wheel assemblies on a second lateral side of the vehicle moving through said vehicle inspection lane, said plurality of associated displacement measurements acquired from a plurality of different vertical elevations;
    a processing system configured to receive said displacement measurements from said first and second plurality of displacement sensors, said processing system further configured to evaluate said received displacement measurements to estimate a measurement of at least one vehicle characteristic.

2. The vehicle inspection system of claim 1 wherein said processing system is configured to evaluate said received displacement measurements to identify outlier measurement data.

3. The vehicle inspection system of claim 2 wherein said outlier measurement data is identified as measurement data which deviates from an average by more than an acceptable tolerance.

4. The vehicle inspection system of claim 2 wherein said processing system is further configured to exclude said identified outlier measurement data from subsequent calculations.

5. The vehicle inspection system of claim 1 wherein said first plurality of displacement sensors are disposed in a first plurality of sensor units; and
    wherein said second plurality of displacement sensors are disposed in a second plurality of sensor units.

6. The vehicle inspection system of claim 1 wherein said processing system is configured to evaluate said received displacement measurements to identify changes in vehicle velocity during vehicle movement through said vehicle inspection lane.

7. The vehicle inspection system of claim 1 wherein said processing system is configured to evaluate said received displacement measurements to detect vehicle suspension movement during vehicle movement through said vehicle inspection lane.

8. The vehicle inspection system of claim 1 wherein said processing system is configured to evaluate said received displacement measurements to detect vehicle steering changes during vehicle movement through said vehicle inspection lane.

9. The vehicle inspection system of claim 1 wherein said processing system is configured to compensate said estimated measurement of at least one vehicle characteristic for suspension bias introduced by the presence of a driver within said vehicle.

10. The vehicle inspection system of claim 1 wherein each displacement sensor includes a two-dimensional imaging pixel array and an emitter assembly configured to project a plurality of laser beams towards said vehicle inspection lane; and
    wherein said two-dimensional imaging pixel array is configured to acquire images of each of said associated laser beams reflected from at least one surface of the vehicle moving through the vehicle inspection lane.

11. The vehicle inspection system of claim 10 wherein said emitter assembly is configured to project said plurality of laser beams along vertically spaced apart measurement axes aligned in parallel on a common vertical axis towards said vehicle inspection lane.

12. A vehicle measurement system, comprising:
    a pair of sensor units disposed in proximity to a vehicle inspection lane through which a moving vehicle passes, with one sensor unit of said pair on each opposite lateral side of said vehicle inspection lane;
    wherein each sensor unit includes a plurality of displacement sensors each configured to acquire a plurality of measurements associated with a rolling wheel assembly on an associated side of a vehicle moving through said vehicle inspection lane between said sensor units, said plurality of measurements from each of said plurality of displacement sensors acquired along a plurality of vertically separated measurement axes;
    wherein each of said sensor units is operatively coupled to convey said plurality of measurements to a processing system configured with software instructions to utilize said conveyed plurality of measurements to determine at least one measure of a vehicle characteristic; and
    wherein said processing system is further configured with software instructions to utilize said conveyed plurality of measurements to determine a plurality of values for a vehicle characteristic, and to evaluate said plurality of determined values of said vehicle characteristic to identify outlier values within said plurality of determined values.

13. The vehicle measurement system of claim 12 wherein said processing system is further configured to utilize at least a portion of said plurality of determined values to establish a representative value for said vehicle characteristic and an associated confidence factor; and
    wherein said confidence factor is related to said identified outlier values.

14. The vehicle measurement system of claim 13 wherein said processing system is further configured to exclude said identified outlier values of said vehicle characteristic from said establishment of said representative value for said vehicle characteristic.

15. A vehicle inspection system for acquiring measurements of a vehicle moving through an inspection lane, comprising:
    a non-contact measurement system configured to acquire displacement measurements associated with the wheel assemblies on each side of the moving vehicle, said displacement measurements acquired from said wheel assemblies at points which are disposed at three or more different vertical elevations;

a drive-over tire tread depth measurement system configured to acquire a plurality of measurements of tire tread depth from at least one wheel assembly of the moving vehicle; and a processing system configured to receive said displacement measurements and said tire tread depth measurements, said processing system configured with software instructions to evaluate said displacement measurements acquired at three or more different vertical elevations to identify at least one alignment characteristic of the vehicle, and to generate an inspection report including said at least one alignment characteristic and, for at least one of said wheel assemblies, a representation of said measured tire tread depth.

16. The vehicle inspection system of claim 15 further including:

a drive-over tire pressure measurement system configured to acquire a measure of tire pressure for at least one wheel assembly of the moving vehicle; and wherein said processing system is further configured to receive said tire pressure measurements and to include a representation of said measured tire pressures in said inspection report.

17. The vehicle inspection system of claim 15 further including at least one camera system, said camera system configured to record at least one image of an external surface on the moving vehicle; and wherein said processing system is configured with software instructions to receive and store said at least one image in a data repository in association with an identifier for the moving vehicle.

18. The vehicle inspection system of claim 15 further including a vehicle identification system, said vehicle identification system including at least one imaging sensor configured to acquire at least one image of an identifying feature on said moving vehicle, and wherein said processing system is configured with software instructions to evaluate said at least one acquired image of said identifying feature to extract vehicle identifying data, and to store said extracted vehicle identifying data in a data repository in association with said inspection report.

19. The vehicle inspection system of claim 15 further including at least one trigger system operatively coupled to said non-contact measurement system configured to initiate acquisition of said displacement measurements and/or to said drive-over tire tread depth measurement system to initiate acquisition of said plurality of measurements of tire tread depth.

20. The vehicle inspection system of claim 15 further including a first trigger system configured to initiate acquisition of said measurements from said non-contact measurement system; and a second trigger system independent of said first trigger system, said second trigger system configured to initiate acquisition of said measurements from said drive-over tire tread depth measurement system.

21. A moving vehicle evaluation system, comprising:

a pair of sensor units disposed on opposite lateral sides of a vehicle inspection lane through which a moving vehicle passes;

wherein each sensor unit is configured to acquire a plurality of distance measurements along respective measurement axes to a surface of a rolling wheel assembly on an associated side of a vehicle moving through said vehicle inspection lane between said sensor units;

wherein each of said sensor units is operatively coupled to convey said plurality of distance measurements to a processing system configured with software instructions to determine, from said acquired plurality of distance measurements and each of said respective measurement axes, a representation of an alignment angle associated with said vehicle; and wherein said processing system is further configured with software instructions to compensate said representation of said alignment angle for a vehicle suspension bias introduced by the presence of a driver within said moving vehicle.

* * * * *